United States Patent [19]

Wilson et al.

[11] Patent Number: 5,018,719
[45] Date of Patent: May 28, 1991

[54] ALIGNER MECHANISM FOR ALIGNING A DOCUMENT IN A BUSINESS MACHINE

[75] Inventors: Hillis L. Wilson, Groton; Barry E. Passer, Newfield; Peter W. Yaichuk, Groton, all of N.Y.

[73] Assignee: NCR Corporation, Dayton, Ohio

[21] Appl. No.: 495,813

[22] Filed: Mar. 16, 1990

[51] Int. Cl.$^5$ .............................................. B65H 9/04
[52] U.S. Cl. .................................. 271/246; 271/245
[58] Field of Search ............... 271/246, 245, 226, 229, 271/247, 272, 273

[56] References Cited

U.S. PATENT DOCUMENTS

| | | |
|---|---|---|
| 3,100,113 | 8/1963 | Bennett et al. . |
| 3,999,749 | 12/1976 | Zambolin et al. ............ 271/246 |
| 4,259,569 | 3/1981 | Passer et al. . |
| 4,283,622 | 8/1981 | Passer et al. . |
| 4,548,521 | 10/1985 | Wirth et al. . |
| 4,632,580 | 12/1986 | Wirth et al. . |
| 4,795,282 | 1/1989 | Bradam . |

FOREIGN PATENT DOCUMENTS

280150 12/1987 Japan ................................ 271/246

Primary Examiner—David H. Bollinger
Attorney, Agent, or Firm—Wilbert Hawk, Jr.; Albert L. Sessler, Jr.; Matthew R. Jenkins

[57] ABSTRACT

The aligner mechanism comprises first and second control sleeves keyed to end portions of a shaft. First and second levers are pivotally mounted on the shaft adjacent to the first and second control sleeves for movement between first and second positions. A pinch roller is rotatably mounted on the levers opposite a drive roller. The aligner mechanism also includes an aligner bar having a first leg portion and a second leg portion secured to the first and second control sleeves respectively, and an engaging portion joining the first and second leg portions. The first lever has a projection cooperating with a control member on the first control sleeve and the second lever has a projection cooperating with a control member on the second control sleeve so as to provide lost motion coupling to pivotally move the first and second levers from a first position to a second position. The aligner bar engages the first wall before the first and second levers are pivotally moved to the second position to introduce a bend in each of the first and second legs causing the engaging portion to be biased against the first wall before the first and second levers rotate to the second position. The projections also cooperate with the control member when a resilient element biases the shaft to the first position to enable the rollers to pinch the document before the engaging portion disengages the first wall.

10 Claims, 9 Drawing Sheets

ALIGNER MECHANISM FOR ALIGNING A DOCUMENT IN A BUSINESS MACHINE

BACKGROUND OF THE INVENTION

1. Field of the Invention

This invention relates to a business machine, and more particularly, it relates to a business machine having an aligner mechanism for aligning a document in the business machine.

2. Description of Related Art

A typical business machine, such as a printer or recorder, includes a printer mechanism for printing data on a document, such as a sales receipt. In some business machines, it is necessary to align a document in a slot within the machine prior to mechanically gripping the document in preparation for printing. Some prior art business machines accomplish aligning the document by using a plurality of solenoids and a complex arrangement of mechanical levers and parts to stop the document in the slot and to grip the document. Thus, these business machines required the use of parts and mechanisms which take up a lot of space and which are expensive.

This invention overcomes these problems by providing a business machine having an aligner mechanism which effects aligning a document without the use of multiple solenoids or complex mechanical arrangements.

SUMMARY OF THE INVENTION

In one aspect, a preferred embodiment of this invention includes an aligner mechanism comprising: a shaft for rotatably mounting in a housing having first and second spaced walls therein which form a slot to receive a document to be aligned in the slot, said shaft having first and second end portions; first and second control sleeves keyed to the first and second end portions, respectively; first and second levers pivotally mounted on the shaft adjacent to the first and second control sleeves, respectively, for pivotal movement between first and second positions; an aligner bar having a first leg portion, a second leg portion, and an engaging portion joining the first and second leg portions, said first and second leg portions being bendable and also being secured to the first and second control sleeves, respectively; actuating means for causing the shaft to rotate from the first position to the second position; and resilient means for biasing the shaft to the first position, said first and second control sleeves each having a control member thereon; said first lever having a projection thereon which cooperates with the control member on the first control sleeve to provide a lost motion coupling therebetween and the second lever having a projection thereon which cooperates with the control member on the second control sleeve to provide a lost motion coupling therebetween to pivotally move the first and second levers to the second position when the shaft is rotated to the second position; said first and second leg portions being secured to the first and second control sleeves, respectively, so that the aligner bar engages the first wall before the first and second levers pivotally move to the second position so as to introduce a bend in each of the first and second legs, thereby causing the engaging portion to be resiliently biased against the first wall before the first and second levers pivot to the second position; said projections cooperating with the control members when the resilient means biases the shaft to the first position to enable the first and second levers to move to the first position before the engaging portion disengages the first wall.

In another aspect, this invention includes: an aligner mechanism for use in a printer, said printer comprising a housing having first and second spaced walls therein forming a slot to receive a document having a bottom edge, said aligner mechanism comprising: a shaft rotatably mounted in the housing, the shaft having first and second end portions; first and second control sleeves keyed to the first and second end portions, respectively; a first lever having first and second ends and a second lever having first and second ends, said first ends of the first and second levers being pivotally mounted on the shaft adjacent to the first and second control sleeves, respectively, for pivotal movement between first and second positions; at least one support rod mounted between the second ends of the first and second levers; a pinch roller rotatably mounted on the support rod between the second ends of the first and second levers; a drive roller rotatably mounted in the printer opposite the pinch roller; an actuating lever secured to one of the first and second control sleeves to rotate the shaft from a first position to a second position; an aligner bar having a first leg portion, a second leg portion, and an engaging portion joining the first and second leg portions, the first and second leg portions being bendable and also being secured to the first and second control sleeves, respectively; and resilient means for biasing the shaft to the first position; said first lever having a projection thereon which cooperates with the control member on the first control sleeve to provide a lost motion coupling therebetween and the second lever having a projection thereon which cooperates with the control member on the second control sleeve to provide a lost motion coupling therebetween to pivotally move the first and second levers to the second position when the shaft is rotated to the second position; said first and second leg portions being secured to the first and second control sleeves, respectively, so that the aligner bar engages the first wall before the first and second levers are pivotally moved to the second position so as to introduce a bend in each of the first and second legs, thereby causing the engaging portion to be resiliently biased against the first wall before the first and second levers rotate to the second position; said engaging portion enabling the document's bottom edge to be aligned between the first and second walls on the engaging portion of the aligner bar; said projections cooperating with the control members when the resilient means biases the shaft to the first position so as to enable the pinch roller and the drive roller to pinch the document before the engaging portion disengages the first wall.

An object of this invention is to provide a business machine and an aligner mechanism which are simple and inexpensive to manufacture.

Another object of this invention is to provide an aligner mechanism which can be easily mounted in a limited amount of space in the business machine.

Another object of this invention is to provide a business machine and an aligner mechanism which utilize only one solenoid to effect moving an aligner bar and pivoting a pinch roller.

Yet another object of this invention is to provide first and second control sleeves which cooperate with first and second levers, respectively, to enable an aligner bar to engage a first wall before the pinch roller disengages the drive roller.

Still another object of this invention is to provide first and second control sleeves which cooperate with first and second levers, respectively, to enable the pinch roller to engage the drive roller before the aligner bar disengages a first wall.

These objects, along with others, will become apparent from a reading of the following drawing, description, and claims.

BRIEF DESCRIPTION OF THE DRAWING

FIG. 3 is a diagram showing the manner in which FIGS. 3A-3C are arranged;

FIGS. 3A-3C taken together show an exploded assembly view of the aligner mechanism shown in FIG. 2;

FIG. 5, which is shown on the sheet containing FIG. 2, is a fragmentary view which is taken along the general line 5—5 of FIG. 2 showing an angular relationship between a projection of a first lever and a first control member of a control sleeve;

DESCRIPTION OF THE PREFERRED EMBODIMENT

Figure 1:
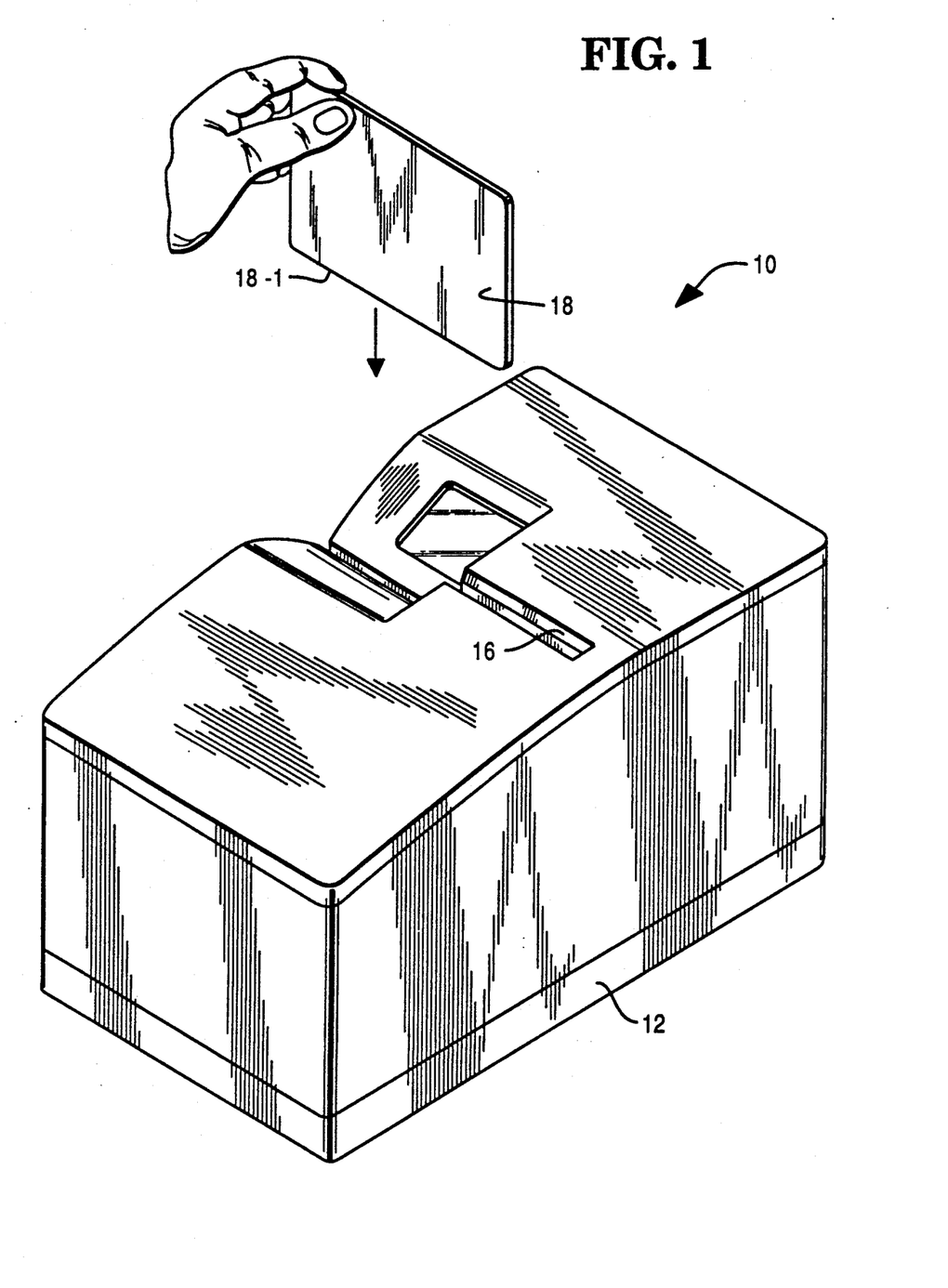
FIG. 1 is a general isometric view of a business machine in which a preferred embodiment of this invention may be used.
Figure 2:
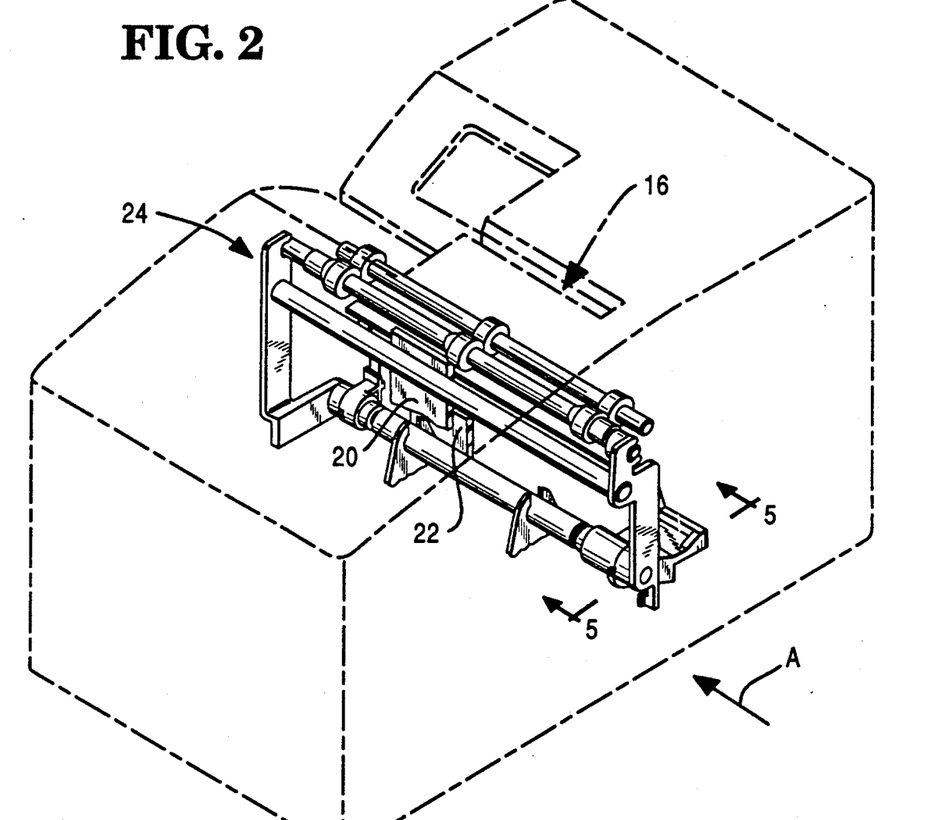
FIG. 2 is an isometric view of the business machine shown in FIG. 1, showing an aligner mechanism therein made according to this invention.
Figures 3, 3A:
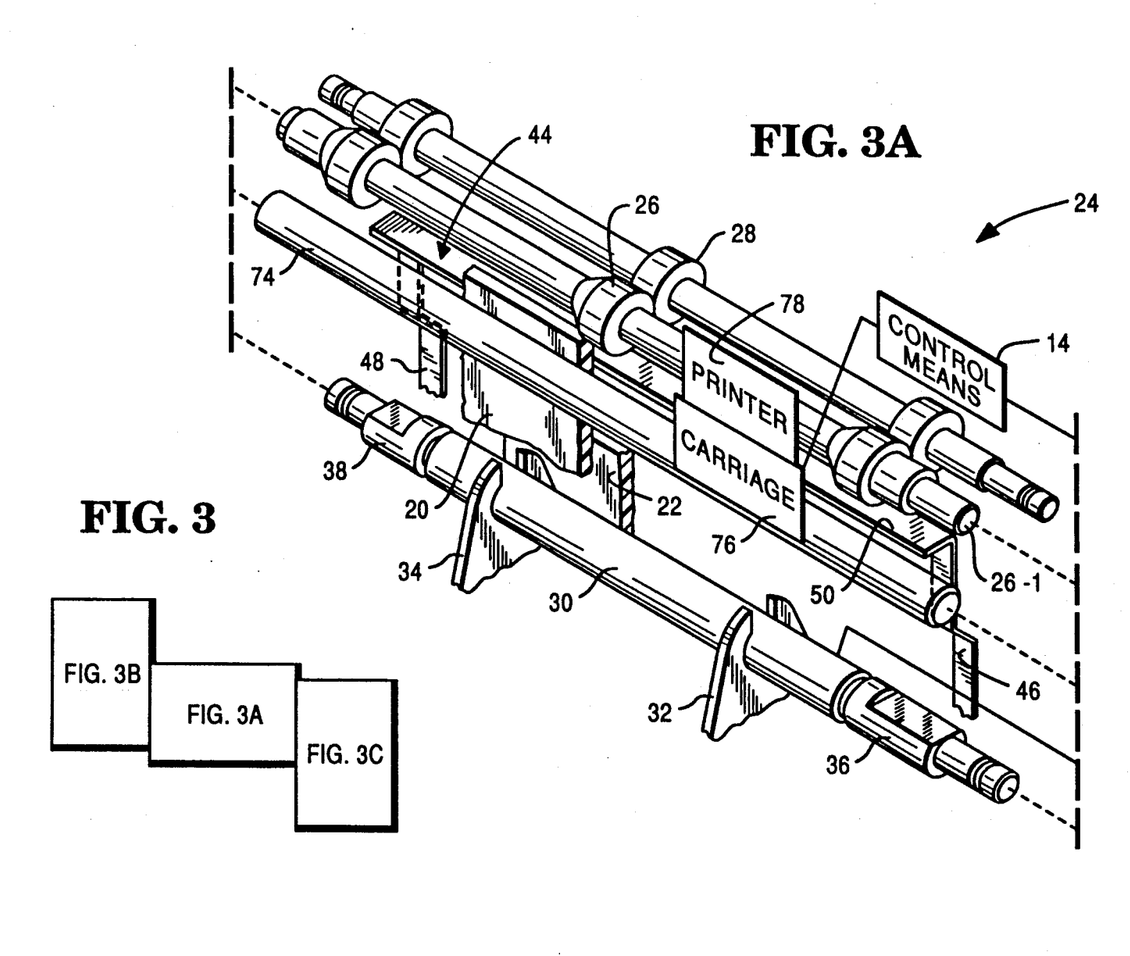
Figure 3B:
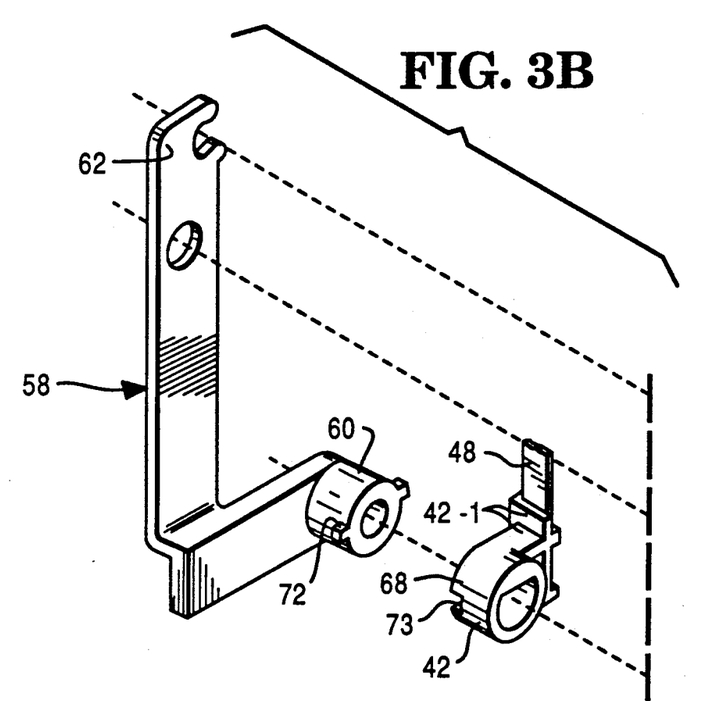
Figure 4:
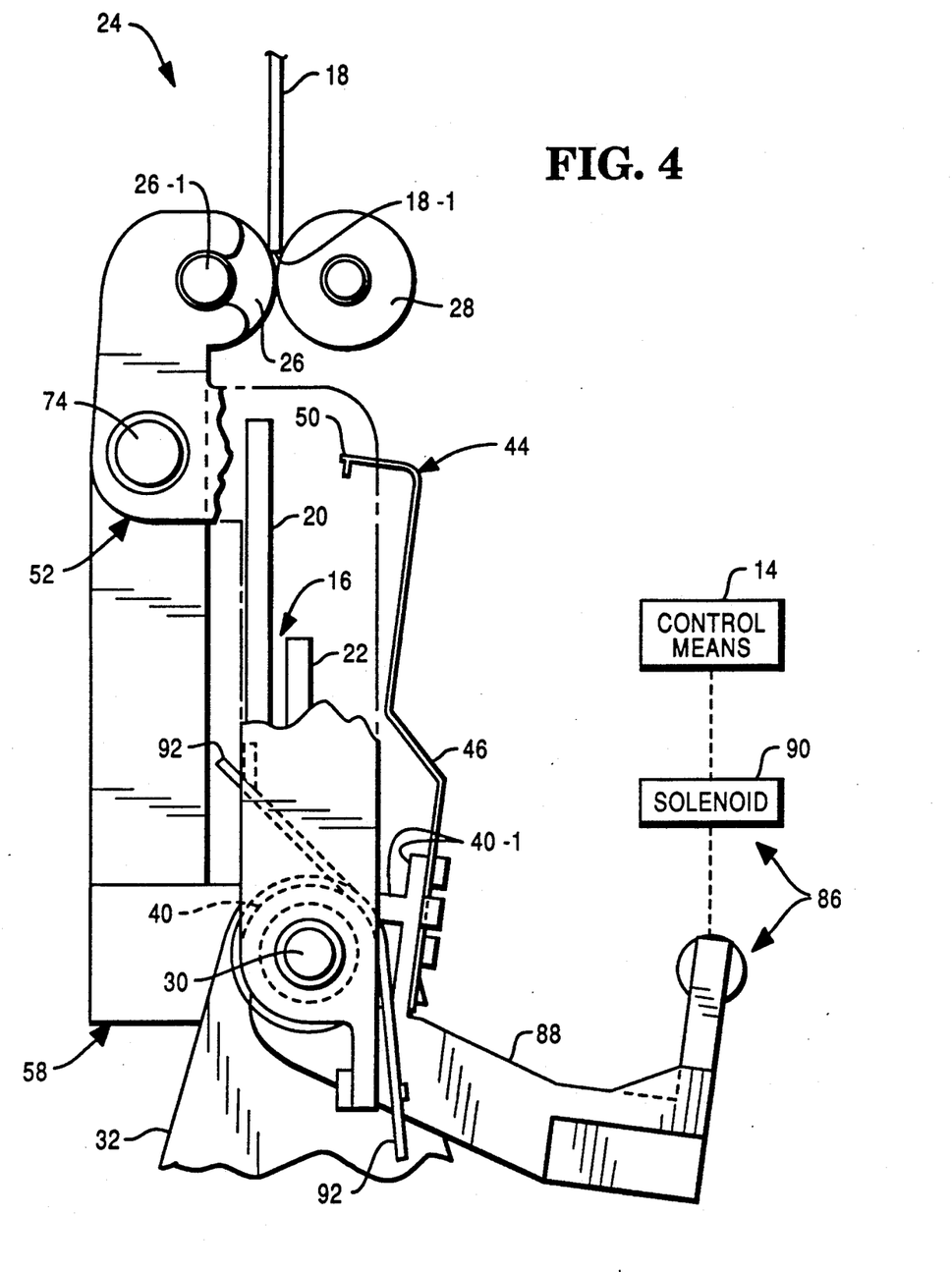
FIG. 4 is a side view of the aligner mechanism taken from the general direction of arrow A in FIG. 2, showing a pinch roller and a drive roller gripping a document.

FIG. 1 is a general isometric view of a business machine 10 in which a preferred embodiment of this invention may be used. The business machine 10 comprises a housing 12 and a control means 14 (seen in FIG. 4) located in the housing 12 for controlling the operation of the business machine 10. The business machine 10 also includes a slot 16 in the top (as viewed in FIG. 1) of the housing 12 in order to permit a document 18 having a bottom edge 18-1 to be inserted into the slot 16 from the top of the business machine 10 so that data can be printed on the document 18. As illustrated in FIGS. 2, 3A, and 4 the slot 16 is formed by a first wall 20 and a second wall 22 which are positioned in spaced parallel relationship to form the slot 16 therebetween. The first and second walls 20 and 22 are conventionally secured to the housing 12 and the slot 16 extends through the housing 12. The first wall 20 is slightly higher than the second wall 22 so as to enable an aligner bar 44 (FIG. 3A) to pass over the top of the second wall 22 in order to engage the first wall 20, as will be discussed later herein.

The business machine 10 further includes an aligner mechanism, designated generally by arrow 24 in FIGS. 2 and 3A-3C. The aligner mechanism 24 is positioned in housing 12 as shown in FIG. 2. The function of the aligner mechanism 24 is to align the document 18 in the slot 16 between a pinch roller 26 and a drive roller 28. The aligner mechanism 24 comprises a shaft 30 which is rotatably mounted in first and second supports 32 and 34 which are an integral part of the housing 12. The shaft 30 has a first end portion 36 and a second end portion 38.

The aligner mechanism 24 (FIGS. 3A-3C) also comprises first and second control sleeves 40 and 42 which are "keyed" to the first and second end portions 36 and 38, respectively. The first and second control sleeves 40 and 42 include control members 66 and 68, respectively. The aligner mechanism 24 also comprises the aligner bar 44 having a first leg portion 46, a second leg portion 48, and an engaging portion 50 joining the first and second leg portions 46 and 48. The first control sleeve 40 has a securing portion 40-1 for securing the first leg portion 46 to the first control sleeve 40, and the second control sleeve 42 has a securing portion 42-1 for securing the second leg portion 48 to the second control sleeve 42. In the embodiment being described, the first and second leg portions 46 and 48 are generally "L" shaped, and they are made of spring steel which makes them resiliently bendable.

Figure 5:
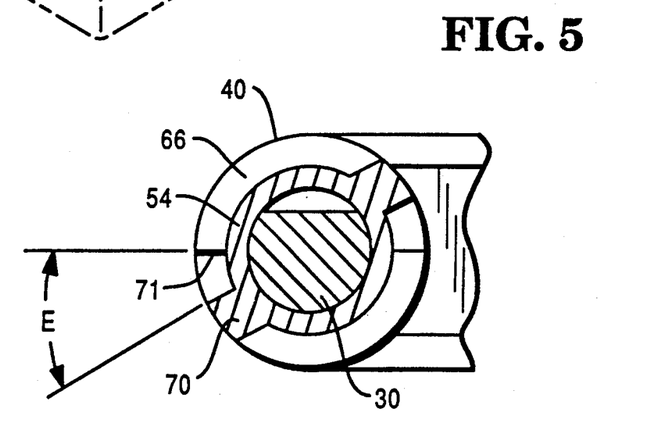

The aligner mechanism 24 (FIGS. 3A-3C) further comprises a first lever 52 having first and second ends 54 and 56 and a second lever 58 having first and second ends 60 and 62. The first ends 54 and 60 are pivotally mounted on the shaft 30 adjacent to the first and second control sleeves 40 and 42. The first ends 54 and 60 include projections 70 and 72, respectively, which engage in complementary notches 71 and 73 in control members 66 and 68. The projections 70 and 72 are smaller than the notches 71 and 73, so that there is lost motion between the sleeves 40, 42 and the members 66, 68, when one is moved with respect to the other. The control members 66 and 68 may be angularly displaced from the projections 70 and 72, respectively, by a predetermined angle (as indicated by double arrow line E in FIG. 5) after these parts are assembled or mounted on the shaft 30. In the embodiment being described, the predetermined angle is less than 4 degrees. The operation of the control members 66 and 68 and projections 70 and 72 will be described later herein.

A support rod 74 (FIG. 3A) is conventionally secured between the second ends 56 and 62 of the first and second levers 52 and 58, respectively. A carriage 76, having a printer or print member 78 secured thereto, is conventionally mounted on the support rod 74. In the embodiment being described, the print member 78 is a conventional 9-wire wire matrix printer, although other printer members may be used. The pinch roller 26, having an axle 26-1, is rotatably mounted between the second ends 56 and 62 of the first and second levers 52 and 58, respectively, in suitable roller bearings (not shown). The drive roller 28 is rotatably mounted in the housing 12 by suitable roller bearings (not shown) so that it is operatively positioned opposite the pinch roller 26. The carriage 76, drive roller 28, print member 78, and pinch roller 26 are all operatively coupled to the control means 14. The control means 14 controls the movement of the carriage 76 as well as the rotation of the rollers 26 and 28.

Figure 3C:
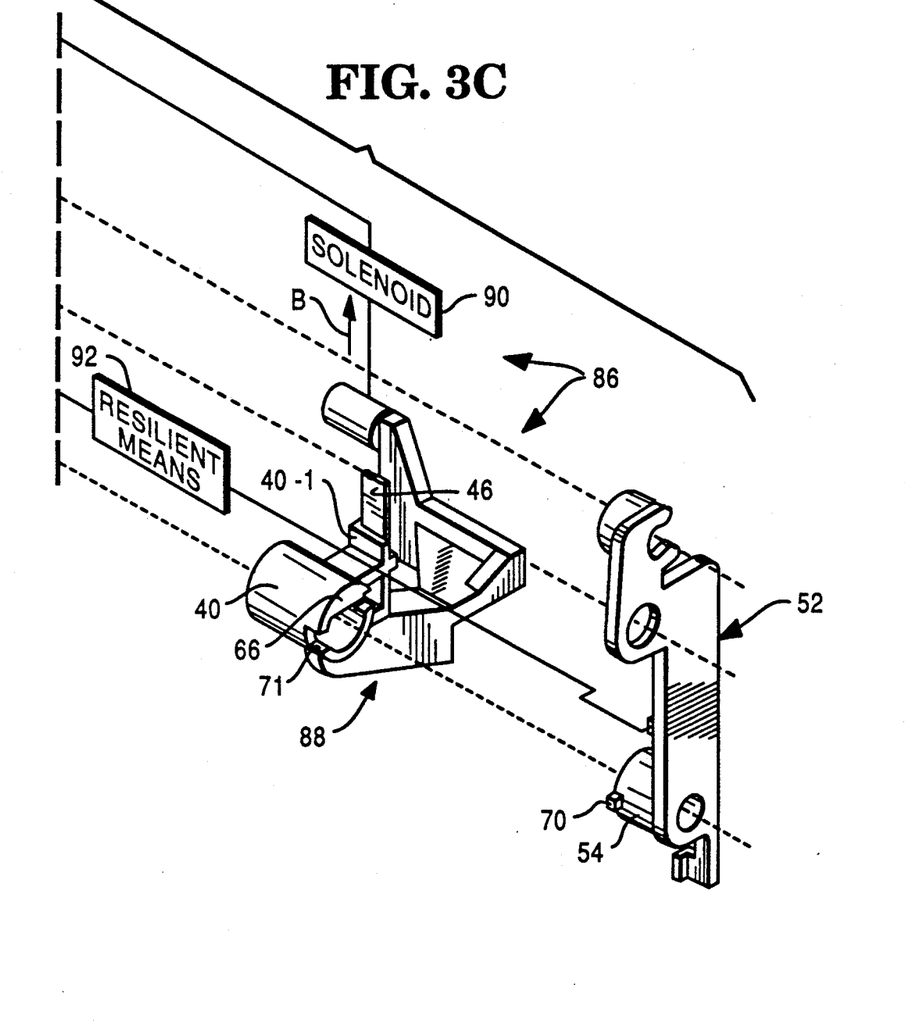

The aligner mechanism 24 (FIGS. 3A–3C) also includes an actuating means 86 for causing the shaft 30 to rotate from a first position to a second position. The first position corresponds to the situation in which the pinch roller 26 and aligner bar 44 are in the position shown in FIG. 6A. The second position corresponds to when the pinch roller 26 and aligner bar 44 are in the position shown in FIG. 6C. The actuating means 86 includes an actuating lever 88 (FIGS. 3C and 4) which is operatively coupled to either the first control sleeve 40 or the second control sleeve 42. In the embodiment described, the actuating lever 88 is molded as part of the first control sleeve 40. The actuating means 86 also includes a solenoid 90 which is operatively coupled to the actuating lever 88. The solenoid 90 is conventionally coupled to the control means 14 as shown. The solenoid 90 is a conventional pull-type solenoid which can pull the actuating lever 88 to move in the direction of arrow B (FIG. 3C). Because the first control sleeve 40 is keyed to the shaft 30, the shaft 30 will rotate in direct proportion to the rotation of the control sleeve 40.

The aligner mechanism 24 further includes resilient means 92 (shown schematically in FIG. 3C) for biasing the shaft 30 and first and second levers 52 and 58 in a clockwise direction (as viewed in FIG. 4) to the first position. In the embodiment being described, the resilient means 92 could be any suitable resilient device, such as a torsion-type spring.

Figures 6A, 6B:
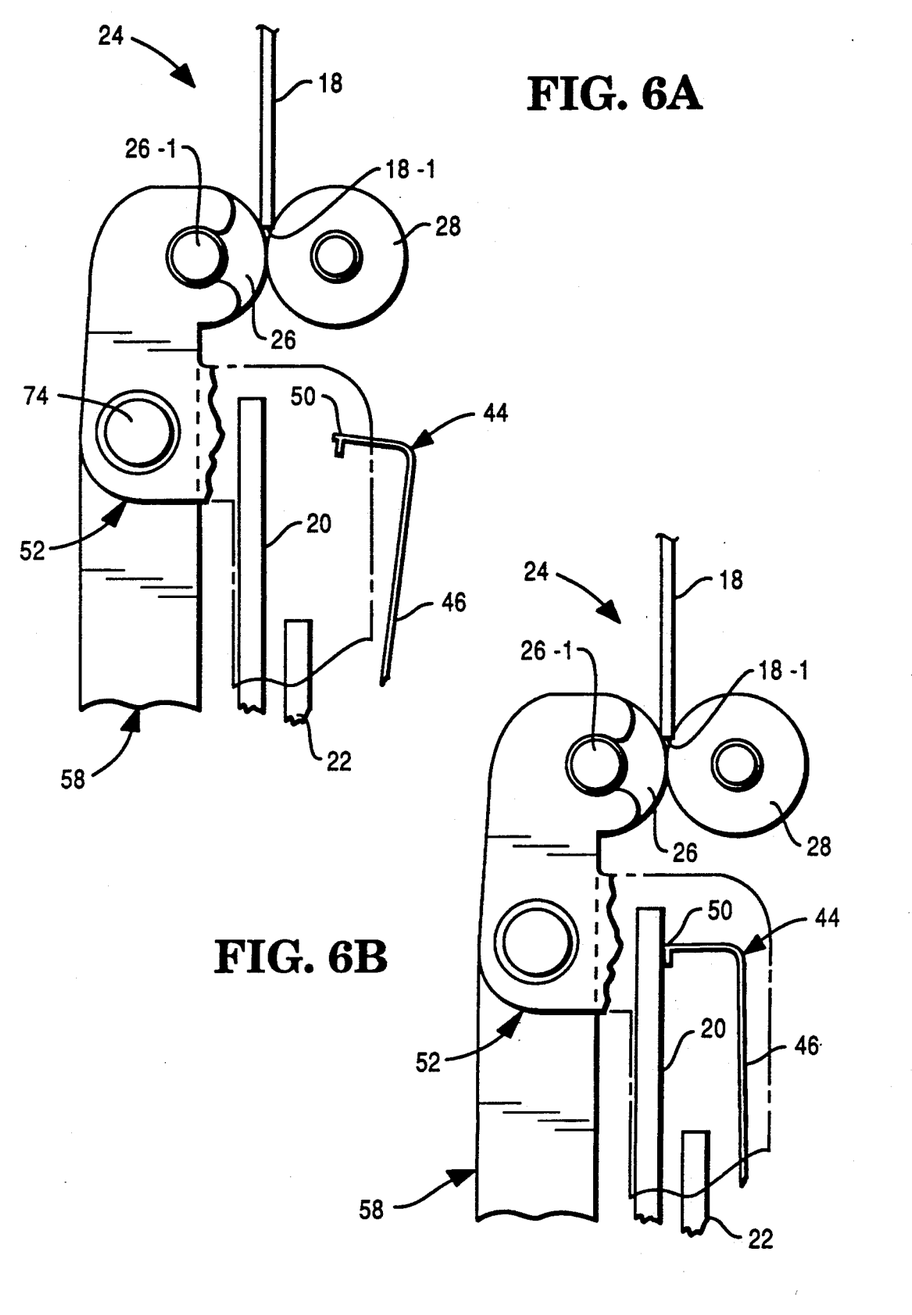
FIG. 6A is a side view similar to FIG. 4, showing a document about to be placed in a document receiving throat or slot, with the drive and pinch rollers engaging each other and with the aligner mechanism in a first position.
FIG. 6B is a view similar to FIG. 6A, showing an aligner bar engaging a first wall of the slot.

The operation of the aligner mechanism 24 in the business machine 10 will now be described. When it is desired to print data or information on the document 18, the document 18 is inserted into slot 16 until the bottom edge 18-1 engages the pinch and drive rollers 26 and 28 (FIG. 6A). The control means 14 energizes the solenoid 90 of actuating means 86 which pulls the actuating lever 88 in the direction of arrow B in FIG. 3C. This in turn causes the first control sleeve 40 and shaft 30 to rotate in a counterclockwise direction as viewed in FIG. 4. The second control sleeve 42 also rotates in the counterclockwise direction because, like the first control sleeve 40, it is keyed to the shaft 30. The angular displacement E (FIG. 5) between control members 66 and 68 and the associated projections 70 and 72 permit the control sleeves 40 and 42 to rotate counterclockwise approximately 4 degrees before the control members 66 and 68 engage the projections 70 and 72, respectively. Just before the control members 66 and 68 rotate to the predetermined angle of 4 degrees, the engaging portion 50 of aligner bar 44 engages the first wall 20 as shown in FIG. 6B. During this initial 4 degrees of movement, the pinch roller 26 remains in the position illustrated in FIG. 6A, and the first and second levers 52 and 58 do not pivot.

Figures 6C, 6D:
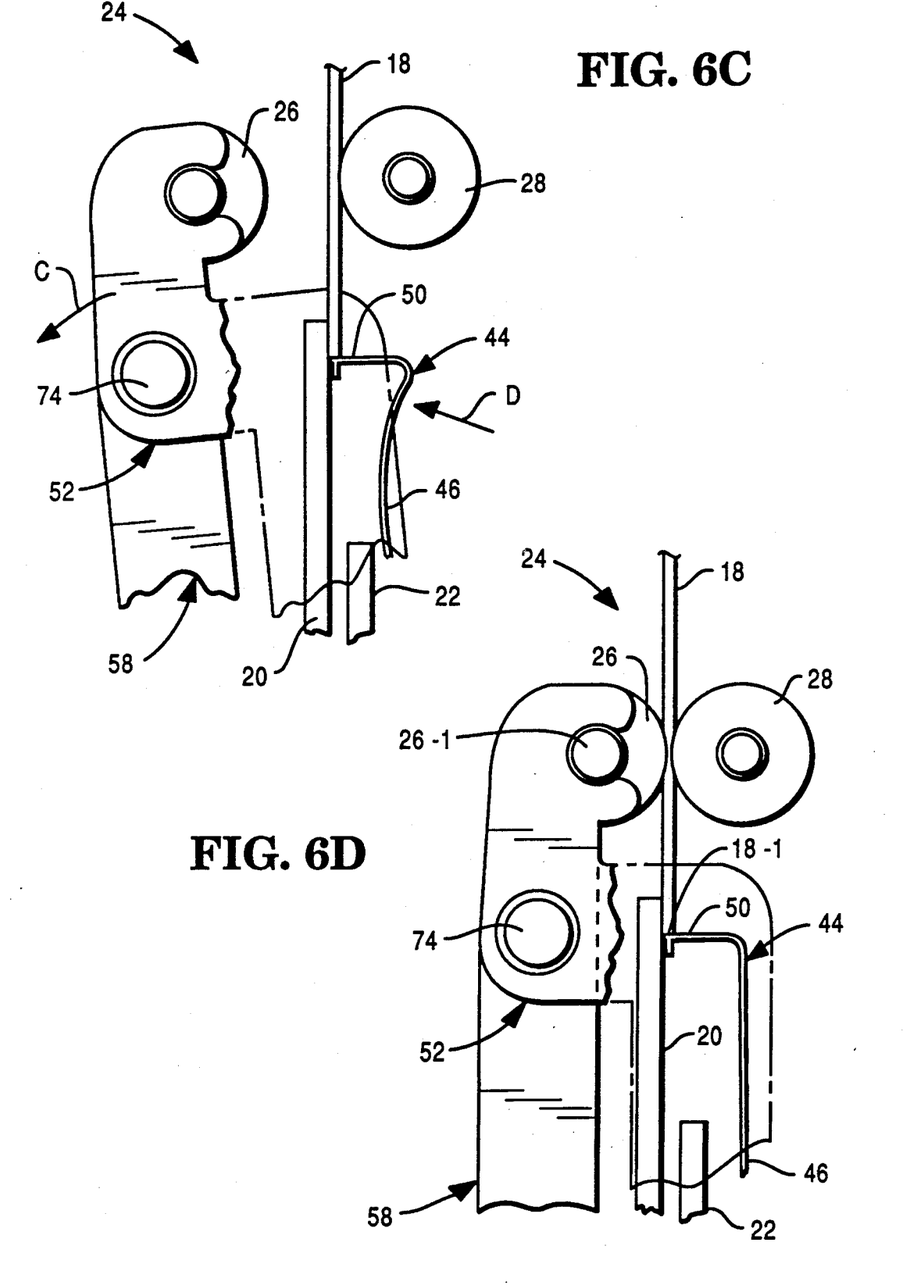
FIG. 6C is a view similar to FIG. 6B, showing the drive and pinch rollers in a second or spaced position, thereby permitting the document to be inserted in the throat and enabling the bottom edge of the document to be aligned on an engaging portion of the aligner mechanism.
FIG. 6D is a view similar to FIG. 6C, showing the pinch roller forcing the document against the drive roller before the aligner bar moves out from underneath the document.

As the shaft 30 rotates counterclockwise beyond 4 degrees in the embodiment described, the control members 66 and 68 engage the projections 70 and 72, respectively, and move the first and second levers 52 and 58 in the direction of arrow C in FIG. 6C. This in turn causes the pinch roller 26 to be moved away from the drive roller 28. Notice that as the shaft 30 rotates beyond 4 degrees, the control sleeves 40 and 42 continue to rotate, and this continued rotation introduces a bend (indicated by arrow D in FIG. 6C) into each of the first and second leg portions 46 and 48. The bend in leg portions 46 and 48 cause the engaging portion 50 to be resiliently biased against the first wall 20 as the pinch roller 26 is being moved away from the drive roller 28. As the pinch roller 26 is moved away from the drive roller 28 (FIG. 6C), the document 18 is inserted or "dropped" until the bottom edge 18-1 of the document 18 engages or becomes aligned with the engaging portion 50 of the aligner bar 44.

After the document 18 is aligned as just described, the pinch roller 26 is then moved towards the drive roller 28 (by de-energizing the solenoid 90) to secure the document 18 therebetween before the aligner bar 44 moves out from underneath the document 18 as shown in FIG. 6D. As mentioned previously herein, the resilient means 92 biases the first and second levers 52 and 58 and shaft 30 to rotate in a clockwise direction (as viewed in FIG. 4) toward the first position. This rotation causes the first and second levers 52 and 58 to pivot toward the first position until the pinch roller 26 forces or pinches the document 18 against the drive roller 28. The resilient means 92 continues to rotate the shaft 30 clockwise which causes the aligner bar 44 to move to the position indicated in FIG. 6E.

Figure 6E:
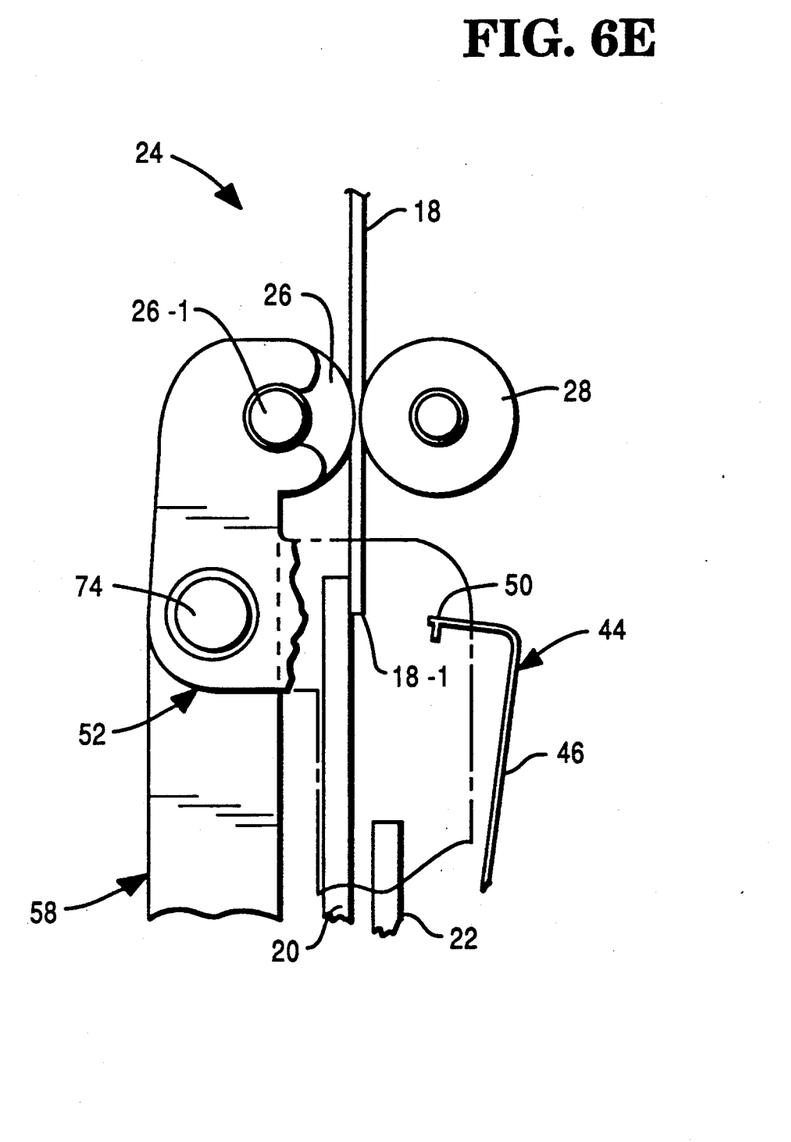
FIG. 6E is a view similar to FIG. 6D, showing the aligner bar in the first position.

After the aligner bar 44 has been moved to the position indicated in FIG. 6E, the carriage 76 and print member 78 can traverse the length of the support rod 74 in order to print a line of data on the document 18. In order to effect printing multiple lines of data, the control means 14 can cause drive roller 28 to rotate clockwise or counterclockwise (as viewed in FIG. 6E) which in turn causes the document 18 to move up or down, respectively, in the slot 16.

When it is desired to remove the document 18 from the business machine 10, the document 18 is moved upwardly in the slot 16 (as viewed in FIG. 4 and 6E) until the bottom edge 18-1 is positioned above the position where the aligner bar 44 engages the first wall 20 or until the document 18 is moved entirely out from between the drive roller 28 and pinch roller 26. This ensures that the engaging portion 50 does not engage the document 18 when the aligner bar 44 moves toward the first wall 20. The method and sequence of operations shown in FIGS. 6A–6E are then repeated. As was described earlier herein, the aligner bar 44 engages the first wall 20 before the pinch roller 26 moves toward the second position shown in FIG. 6C. This prevents the document 18 from falling below the engaging portion 50 to the bottom of the slot 16 after the pinch roller 26 disengages the drive roller 28. It is to be noted that the solenoid 90 may not be energized until the document 18 has been removed from the slot 16 and then only if it is desired to print on another document 18. By not opening the pinch roller 26 and drive roller 28, the document is at the maximum height for an operator to grip and remove the document 18 from the business machine 10.

While the invention has been described with reference to a specific embodiment, this description is merely illustrative, and it is not to be construed as limiting the scope of the invention. Various other modifications and changes may occur to those skilled in the art without departing from the spirit and scope of the invention as defined by the appended claims.

What is claimed is:

1. An aligner mechanism comprising:
   a shaft for rotatably mounting in a housing having first and second spaced walls therein which form a slot to receive a document to be aligned in said slot, said shaft having first and second end portions;

first and second control sleeves keyed to said first and second end portions, respectively;

first and second levers pivotally mounted on said shaft adjacent to said first and second control sleeves, respectively, for pivotal movement between first and second positions;

an aligner bar having a first leg portion, a second leg portion, and an engaging portion joining said first and second leg portions, said first and second leg portions being bendable and also being secured to said first and second control sleeves, respectively;

actuating means for causing said shaft to rotate from said first position to said second position; and resilient means for biasing said shaft to said first position;

said first and second control sleeves each having a control member thereon;

said first lever having a projection thereon which cooperates with said control member on said first control sleeve to provide a lost motion coupling therebetween and said second lever having a projection thereon which cooperates with said control member on said second control sleeve to provide a lost motion coupling therebetween to pivotally move said first and second levers to the second position when said shaft is rotated to said second position;

said first and second leg portions being secured to said first and second control sleeves, respectively, so that said aligner bar engages said first wall before said first and second levers pivotally move to said second position so as to introduce a bend in each of said first and second legs, thereby causing said engaging portion to be resiliently biased against said first wall before said first and second levers pivot to said second position;

said projections cooperating with said control members when said resilient means biases said shaft to said first position to enable said first and second levers to move to said first position before said engaging portion disengages said first wall.

2. The aligner mechanism as recited in claim 1 in which said actuating means includes an actuating lever secured to one of said first and second control sleeves.

3. The aligner mechanism as recited in claim 1 in which said first and second leg portions are each generally "L"-shaped.

4. The aligner mechanism as recited in claim 1 in which said resilient means includes a spring operatively coupled to one of said first and second levers to bias said shaft to said first position.

5. An aligner mechanism for use in a printer, said printer comprising a housing having first and second spaced walls therein forming a slot to receive a document having a bottom edge, said aligner mechanism comprising:

a shaft rotatably mounted in said housing, said shaft having first and second end portions;

first and second control sleeves keyed to said first and second end portions, respectively;

a first lever having first and second ends and a second lever having first and second ends, said first ends of said first and second levers being pivotally mounted on said shaft adjacent to said first and second control sleeves, respectively, for pivotal movement between first and second positions;

at least one support rod mounted between said second ends of said first and second levers;

a pinch roller rotatably mounted on said support rod between said second ends of said first and second levers;

a drive roller rotatably mounted in said printer opposite said pinch roller;

an actuating lever secured to one of said first and second control sleeves to rotate said shaft from a first position to a second position;

an aligner bar having a first leg portion, a second leg portion, and an engaging portion joining said first and second leg portions, said first and second leg portions being bendable and also being secured to said first and second control sleeves, respectively; and resilient means for biasing said shaft to said first position;

said first lever having a projection thereon which cooperates with said control member on said first control sleeve to provide a lost motion coupling therebetween and said second lever having a projection thereon which cooperates with said control member on said second control sleeve to provide a lost motion coupling therebetween to pivotally move said first and second levers to said second position when said shaft is rotated to said second position;

said first and second leg portions being secured to said first and second control sleeves, respectively, so that said aligner bar engages said first wall before said first and second levers are pivotally moved to said second position so as to introduce a bend in each of said first and second legs, thereby causing said engaging portion to be resiliently biased against said first wall before said first and second levers rotate to said second position; said engaging portion enabling the document's bottom edge to be aligned between the first and second walls on said engaging portion of said aligner bar;

said projections cooperating with said control members when said resilient means biases said shaft to said first position so as to enable said pinch roller and said drive roller to pinch the document before said engaging portion disengages said first wall.

6. The aligner mechanism as recited in claim 5 in which said first and second leg portions are each generally "L"-shaped.

7. The aligner mechanism as recited in claim 5 in which said engaging portion rotates not more than a predetermined angle and said first and second levers rotate through an angle larger than said predetermined angle when said shaft is rotated to said second position.

8. The aligner mechanism as recited in claim 5 in which said first and second leg portions are made of spring steel.

9. The aligner mechanism as recited in claim 5 in which said actuating means further comprises:

a solenoid coupled to said actuating lever to rotate said shaft to said second position; and control means operatively coupled to said solenoid and said drive roller for controlling the operation of the solenoid and also for driving the drive roller.

10. An aligner mechanism for use in a printer, said printer comprising a housing having a slot formed by at least a first wall, said slot being capable of receiving a document having a bottom edge, said aligner mechanism comprising:

a pinch roller;
a drive roller rotatably mounted opposite said pinch roller;
a shaft rotatably mounted in said housing;
support means for supporting said pinch roller, said support means connected to said shaft for rotation therewith about the axis of said shaft, said support means moving said pinch roller from a first position in engagement with said driver roller to a second position away from said drive roller; and
a document aligner including an engaging portion for engaging said first wall to permit alignment of the document in said slot and also including a bendable leg portion, said bendable leg portion mounted at its end opposite said engaging portion to said shaft for rotation therewith, so that when said shaft is rotated to move said pinch roller from its first position to its second position, said leg portion bends while said engaging portion remains in resilient engagement with said first wall, said engaging portion also remaining in resilient engagement with said first wall when said pinch roller is moved from said second position to said first position.

* * * * *